United States Patent [19]

Asai et al.

[11] Patent Number: 5,521,780
[45] Date of Patent: May 28, 1996

[54] TAPE CASSETTE AND MAGNETIC RECORDING/REPRODUCING APPARATUS USED THEREFOR

[75] Inventors: Shigemi Asai; Tohru Okuda; Hideo Okada, all of Nara; Hiroaki Takeuchi; Takamitsu Tadera, both of Tenri, all of Japan

[73] Assignee: Sharp Kabushiki Kaisha, Osaka, Japan

[21] Appl. No.: 266,786

[22] Filed: Jun. 28, 1994

Related U.S. Application Data

[63] Continuation of Ser. No. 981,440, Nov. 25, 1992, abandoned.

[30] Foreign Application Priority Data

Nov. 26, 1991 [JP] Japan ................................. 3-310670

[51] Int. Cl.⁶ .................................................. G11B 23/087
[52] U.S. Cl. ............................................................. 360/132
[58] Field of Search .................................... 360/104–105, 360/132

[56] References Cited

U.S. PATENT DOCUMENTS

| | | | |
|---|---|---|---|
| 4,257,077 | 3/1981 | Ishida | 360/132 X |
| 4,513,928 | 4/1985 | Hackett | 360/132 X |
| 4,513,929 | 4/1985 | Oishi et al. | 360/132 X |
| 4,593,335 | 6/1986 | Sato et al. | 360/132 X |
| 4,747,007 | 5/1988 | Ikebe et al. | 360/132 |
| 4,763,218 | 8/1988 | Westfall et al. | 360/132 |
| 4,780,782 | 10/1988 | Bordignon | 360/132 X |

FOREIGN PATENT DOCUMENTS 60-140276  9/1985  Japan.
63-58387   4/1988  Japan.

Primary Examiner—John H. Wolff

[57] ABSTRACT

The present invention has been achieved to provide a novel tape cassette capable of stable and excellent magnetic recording and reproducing operations realizes highly accurate head touch necessary for tendency to Hi-Fi and digitization with a simple structure that does not require relatively high shape accuracy. In order to achieve the above object, a novel tape cassette for use in magnetic recording/reproducing apparatus of fixed head type, comprises: magnetic tape 2, a pressure pad 3 and a pad base 13 having the pressure pad 3 fixed thereon, incorporated in a tape cassette 10, being characterized in that when a magnetic head 8 is inserted in the tape cassette 10, the pad base 3 is positioned relative to the magnetic head 8 by positioning pins 17a and 17b disposed in the magnetic recording/reproducing apparatus.

18 Claims, 18 Drawing Sheets

Section X-X,Y-Y

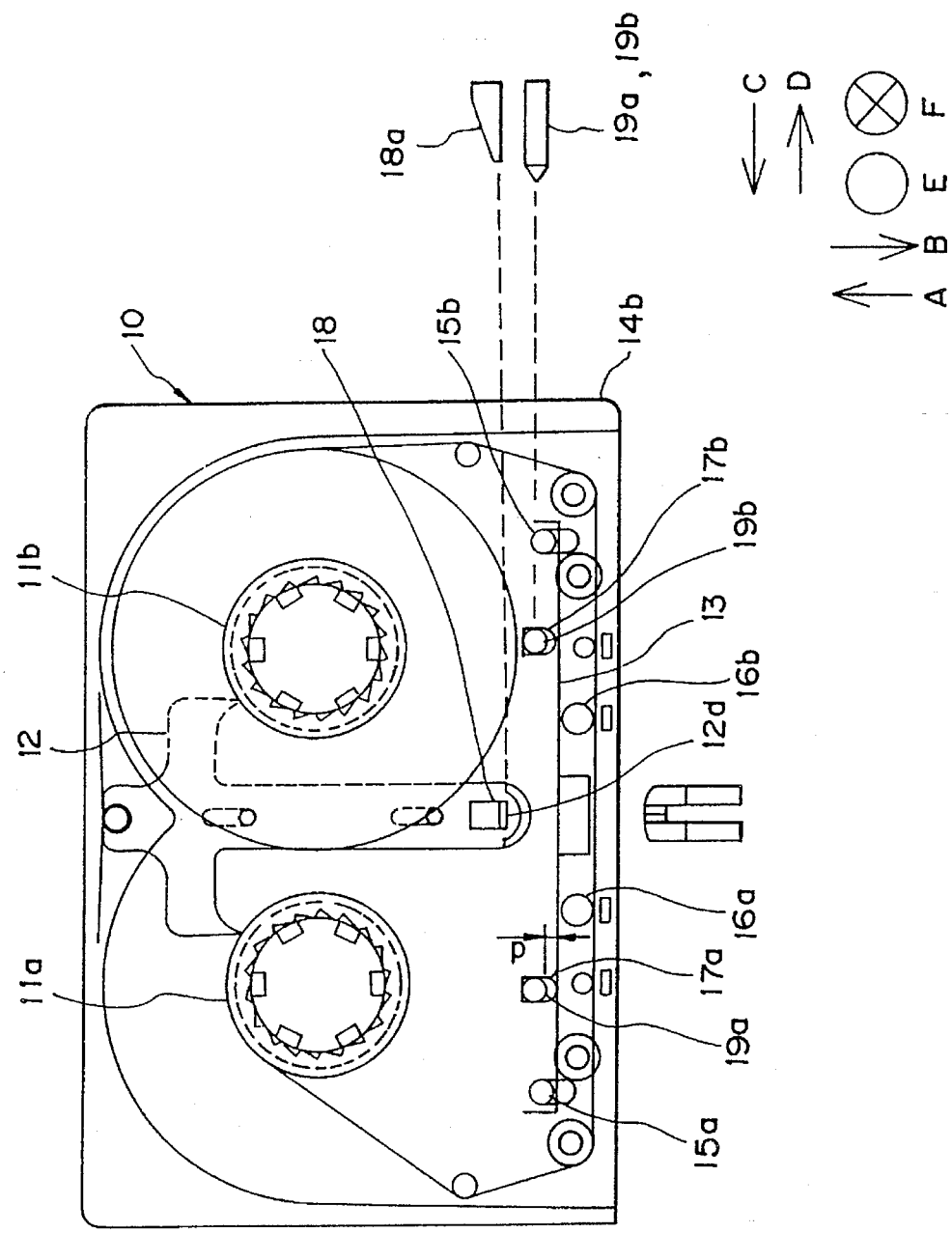

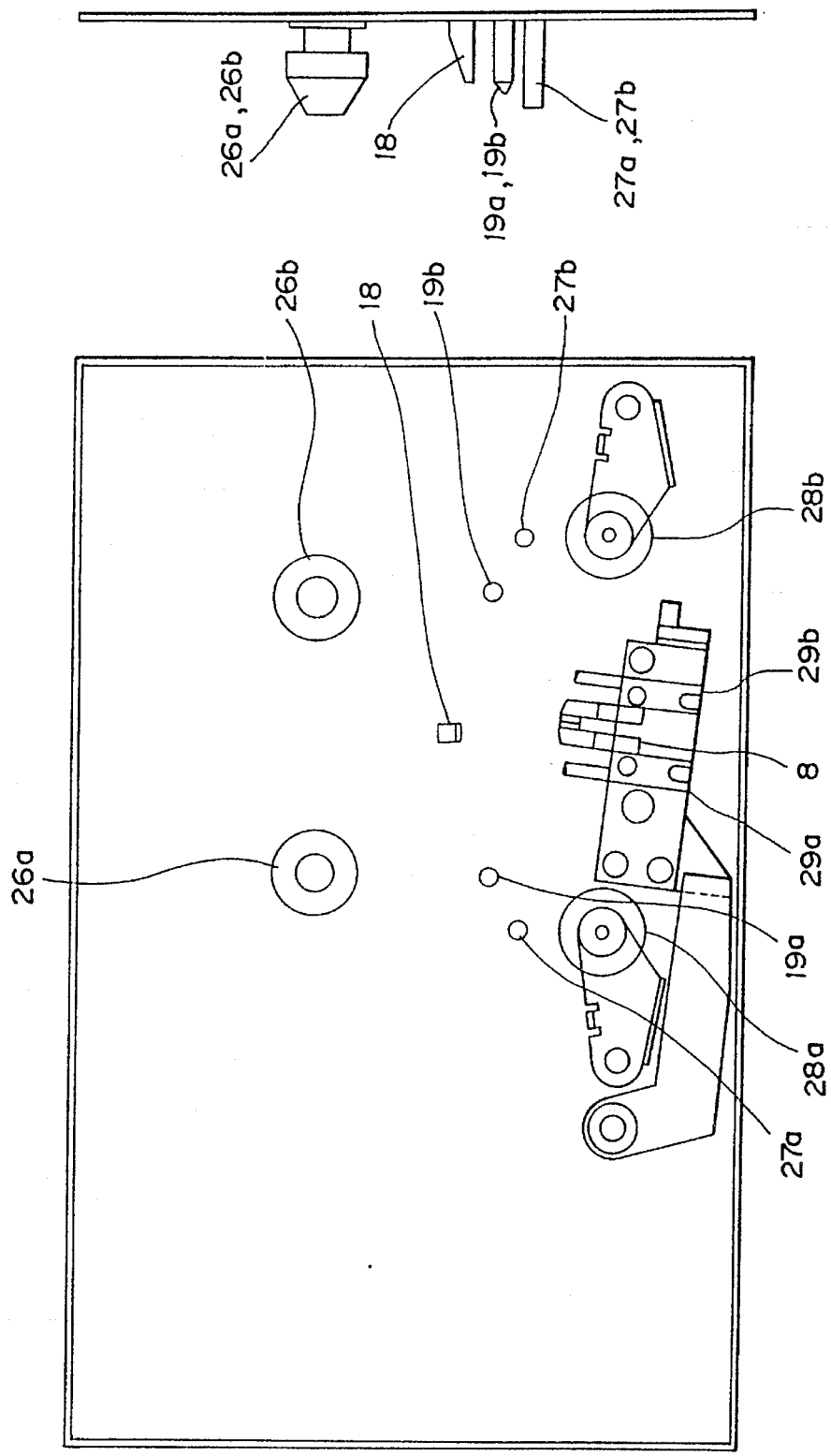

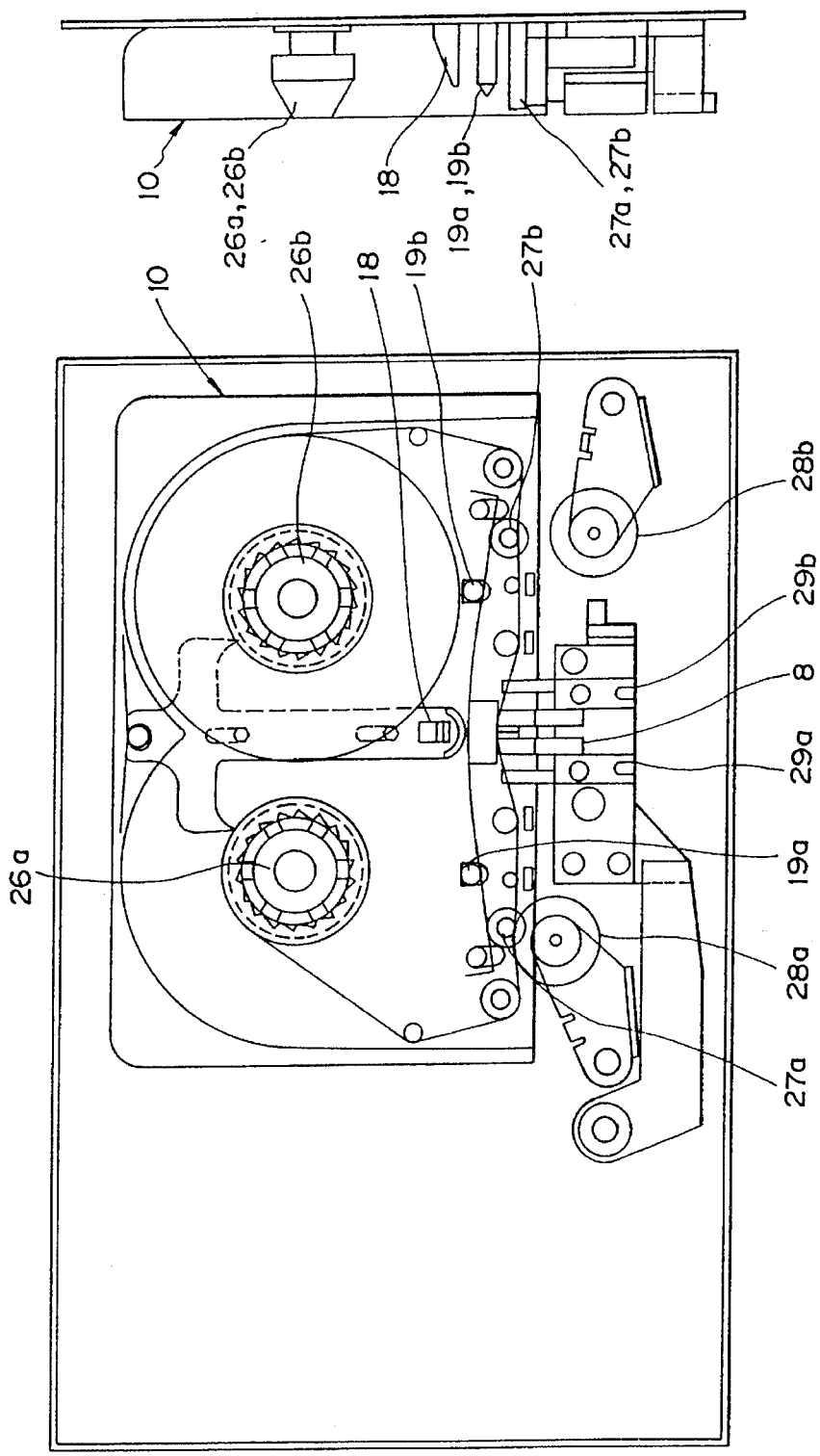

scale 2:1

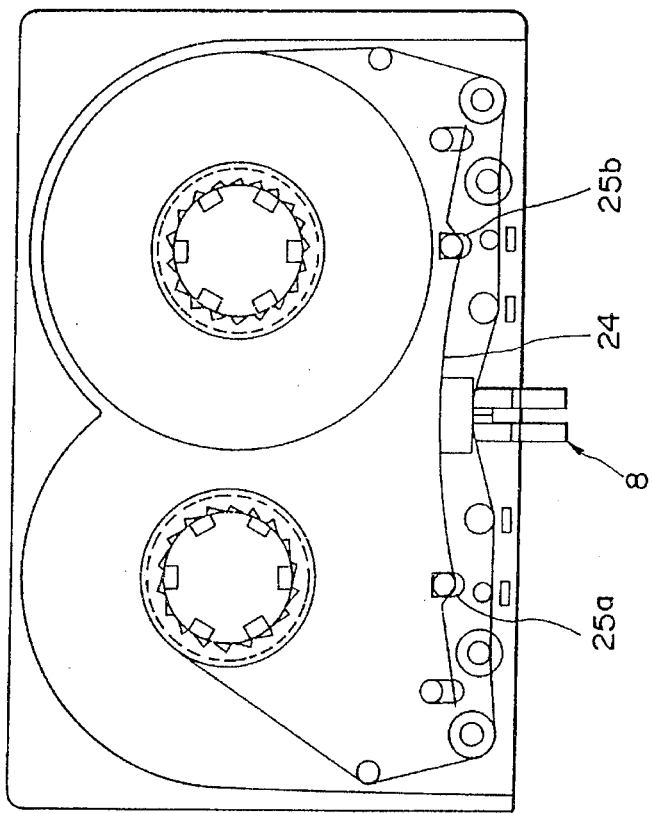
FIG.19(a)
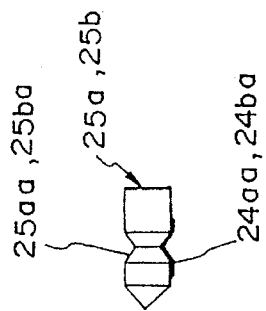
FIG.19(b)
scale 2:1
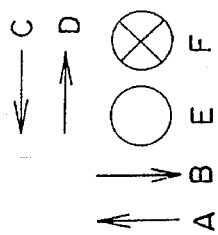

TAPE CASSETTE AND MAGNETIC RECORDING/REPRODUCING APPARATUS USED THEREFOR

This application is a continuation of application Ser. No. 07/981,440 filed on Nov. 25, 1992, now abandoned.

BACKGROUND OF THE INVENTION

(1) Field of the Invention

The present invention relates to a novel tape cassette for use in magnetic recording/reproducing apparatus of fixed head type. More specifically, the present invention is directed to provide a tape cassette having magnetic tape and a pressure pad incorporated therein, and in particular suitable for positioning the pressure pad precisely relative to the magnetic head. The present invention is effective for a tape cassette used for a magnetic recording/reproducing apparatus of fixed head type which performs recording operations using a large number of tracks at a high recording frequency.

(2) Description of the Prior Art

FIG. 1 shows a embodiment of an prior art tape cassette. An illustrated tape cassette 1 indicates a compact type cassette, which has magnetic tape 2 and a pressure pad 3 incorporated therein. The pressure pad 3 is adhesively supported by a pad base 4. The pad base 4 with the pressure pad 3 is supported by pad base supporting pins 6a, 6b and 7a, 7b, all of which are integrally resin-molded as part of a cassette half 5b. Next referring to FIG. 2, once a magnetic head 8 is inserted in the tape cassette 1, the magnetic tape 2 is pressed against the magnetic head 8 by the pressure pad 3 with a constant pressure. In this state, with the magnetic tape 2 running, the magnetic head conducts recording or reproducing operation of signals. In this situation, the pressure of the pressure pad 3 is mainly generated by deformation or curvature of the pad base 4. This pressing force by the pressure pad 3 determines a space between the magnetic head 8 and the magnetic tape 2. The space has an intimate relation with the recording frequency, that is, if the recording frequency is high, the space need be set narrow.

Meanwhile, in order to effect recording/reproducing operations with stability, it is necessary that the pressure pad 3 presses the magnetic tape 2 against the magnetic head 8 with a uniform pressure distribution. Particularly, the pressure distribution across the width direction of the magnetic tape 2, or along the direction across which a large number of recording/reproducing tracks are disposed in parallel with one another, has a great influence on recording/reproducing characteristics in each track, therefore, control with high precision is desired. In other words, the alignment or the degree of parallelism between a facing surface 3a of the pressure pad 3 to the magnetic head 8 and a facing surface 8a of the magnetic head 8 to the pressure pad 3 can pose a problem. In the prior art tape cassette 1, since the pressure pad 3 is held adhesively, as stated above, by the pad base 4, the pad base 4 in practice should be supported in parallel with the facing surface 8a. Here, it is possible to arrange the facing surface 3a relative to positioning support surfaces 4a, 4b (to be abbreviated simply as supporting surfaces 4a, 4b hereinafter) in a degree of parallelism which would not cause a problem.

The pad base 4 is supported by the pad base supporting pins 6a, 6b, 7a and 7b as stated above. More specifically, when the magnetic head 8 is not inserted in the tape cassette 1, the pad base 4 is supported movable in a direction of the magnetic head 8 insertion with constant clearances provided between pad base supporting pins between 6a and 7a, and between 6b and 7b. On the other hand, when the magnetic head 8 is inserted in the tape cassette 1, the pad base 4 is pressed and supported with the supporting surfaces 4a and 4b abutting against the pad base supporting pins 6a and 6b, respectively. Accordingly, to sum up for general analysis, the pressure distribution of the magnetic tape 2, is dependent upon the parallelism of the facing surface 8a of the magnetic head 8 relative to the pad base supporting pins 6a and 6b. Here, as concern the pad base supporting pins 6a and 6b, since these pad base supporting pins 6a and 6b are integrally resin-molded as part of the cassette half 5b as mentioned above, the pins are provided with draft for molding die, so that the shape of the pins is tapered in place of uniform cylindrical form. As a result, it is very difficult to control the parallelism of the pins to the facing surface 8a with high accuracy.

In the prior art, to overcome this problem, the torsional rigidity of the pad base 4 across the width of the magnetic tape 2 is optimized such that the deviation of parallelism between the facing surfaces 8a and 3a can be absorbed by the twisting of the pad base 4. This, however, could not be a drastic measure for uniformalizing the aforesaid pressure distribution, and thus the problem has been an obstacle to performing high recording density.

It is also desirable to control the absolute value of the pressing force generated by the pressure pad 3 itself so as not to deviate from a set-up value. Basically, the pressing force is determined by the positional relationship between the magnetic head 8, the pressure pad 3 and the pad base 4, if a spring constant of the pad base 4 with respect to the head inserting direction is fixed. Here, the pressure pad 3 and the pad base 4 are formed integrated, therefore if the tolerance of the thickness of the pressure pad 3 is neglected, the positional relationship between the magnetic head 8 and the pad base 4 is a matter to be considered. If the magnetic head 8 is inserted in the tape cassette 1, the position of the magnetic head 8 is regulated with high precision on the mechanism of a tape recorder or the like. On the other hand, the pad base 4 is positioned such that the support surfaces 4a and 4b abut against the pad base supporting pins 6a and 6b, that is, the position of the pad base 4 is dependent upon the bad base supporting pins 6a and 6b. As stated above, the pad base supporting pins 6a and 6b are resin-moulded integrally with the cassette half 5b, which in turn is positioned relative to the above-said mechanism by reference holes 9a and 9b receiving unillustrated reference pins (for positioning the cassette half 5b) planted on the mechanism.

To summarize what has been discussed above, the positioning accuracy of the pad base 4 to the magnetic head 8 is determined by the sum of the following four elements:

(A) an assembling tolerance at the time when the magnetic head 8 is assembled to the mechanism (namely, the dimensional tolerance of the distance between the magnetic head 8 and the reference pins on the mechanism);

(B) a positioning tolerance at the time when the cassette half 5b (or the tape cassette 1 in a broad sense) is fitted in the mechanism;

(C) a positional tolerance of the distance between the reference holes 9a and 9b on the cassette half 5b and the pad base supporting pins 6a and 6b; and (D) a thickness tolerance of the pressure pad 3.

Of these, the item (C) is dependent upon the molding accuracy of the cassette half, and the accuracy of this has been particularly difficult to regulate.

Various kinds of proposals have been disclosed as regards the present invention. Namely, Japanese Utility Model Laid-Open Publication No.sho-60-140276/1985 discloses a tape cartridge (corresponding to the tape cassette) including a spring plate for supporting a pad disposed with both ends thereof abutted against the inner part of a front opening of the body case, characterized in that both ends of the spring plate are supported through elastic cushion means by spring receiving means disposed on the body case. The tape cartridge, according to the disclosed publication, is arranged such that both ends of the spring plate (corresponding to the pad base) are supported by the spring receiving means (corresponding to the pad base supporting pins) on the side of the body case through cushion means. This arrangement can prevent a defective assembled posture of the spring plate and the positional displacement in operation. The method of the disclosure can compensate for the molding tolerance of the pad base supporting pins in some degree, but is not enough to regulate the parallelism of the pad base in high precision, or the above element (C) could not be eliminated.

Another proposal is made by Japanese Utility Model Publication Laid-Open No.sho-63-58387/1988, which discloses a tape cartridge having a pad means comprising a pair of tape guiding pins planted right and left inside a window disposed on the front side of a body case for receiving a magnetic head; a pair of pad supporting ribs disposed on the right and left, and in an inner side of, the tape guide pins; a plate spring with both ends thereof bent backward to form bending pieces; and a pad provided on the front side of the plate spring. The pad means is abutted to and supported by the pad supporting ribs at intermediate portions between the pad on the plate spring and each of the bending pieces. The tape cartridge disclosed by the publication is characterized in that the pad supporting ribs for supporting the pad means (corresponding to the pad base) in its width direction, are disposed closer to the pad than the tape guide pins, so that the pad means may be supported upright on the supporting ribs. In the method of this publication, the parallelism of the pad means is affected greatly by the molding accuracy of the supporting ribs, therefore the difficulty in accuracy control cannot be eliminated.

SUMMARY OF THE INVENTION

The present invention has been achieved under consideration of the problems discussed above, and it is therefore an object of the present invention to provide a novel tape cassette, capable of effecting an excellent magnetic recording/reproducing operation with a highly accurate head touch which is demanded by a tendency to Hi-Fi mode and digitization with a simple structure that does not require relatively high shape accuracy.

The above object of the present invention can be achieved by providing a tape cassette for use in magnetic recording/reproducing apparatus of fixed head type, comprising: magnetic tape, a pressure pad and a pad base having the pressure pad fixed thereon, incorporated in a tape cassette, being characterized in that when a magnetic head is inserted into the tape cassette, the pad base is positioned relative to the magnetic head by positioning means disposed in the magnetic recording/reproducing apparatus.

According to one aspect of the present invention, a tape cassette is preferably characterized in that when the tape cassette is not engaged in the magnetic recording/reproducing apparatus, the pad base is pressed with pre-load so that the pad base is elastically deformed or curved in a direction of insertion or retraction of the magnetic head.

According to another aspect of the present invention, a tape cassette is preferably characterized in that when the tape cassette is not engaged in the magnetic recording/reproducing apparatus, a reel locking mechanism is provided for locking the revolution of reels on which the magnetic tape is wound.

According to still another aspect of the present, invention, a tape cassette is preferably characterized in that the pre-load provided against said pad base is provided by the afore-said reel locking mechanism.

According to a further aspect of the present invention, a tape cassette is preferably characterized in that the pre-load provided for the pad base is provided by the afore-said reel locking mechanism.

According to still a further aspect of the present invention, a tape cassette is preferably characterized in that when the tape cassette is engaged in the magnetic recording/reproducing apparatus, the pre-load provided against the pad base is released linked with the release of the afore-said reel locking mechanism.

According to another aspect of the present invention, a tape cassette is preferably characterized in that when the tape cassette is engaged in the magnetic recording/reproducing apparatus, the pre-load provided against the pad base is released linked with the release of the afore-said reel locking mechanism.

According to a further aspect of the present invention, a tape cassette is preferably characterized in that when the tape cassette is engaged in the magnetic recording/reproducing apparatus, a state of the pre-load provided against the pad base is unchanged, and the pre-load is released when the magnetic head is inserted.

According to still a further aspect of the present invention, a tape cassette is preferably characterized in that when the magnetic head is inserted into the tape cassette, engaging means for engagement between the pad base and the positioning means, is provided for each of the positioning means and the pad base.

According to still another aspect of the present invention, a tape cassette is preferably characterized in that the engaging means for engaging between the pad base and the positioning means comprises projections provided on the pad base and grooves provided on the positioning means.

In accordance with the present invention, by using the positioning means disposed in the magnetic recording/reproducing apparatus, it becomes unnecessary to strictly control the dimensional tolerances (B) and (C) of the afore-mentioned four dimensional tolerances (A) to (D), which dominate the accuracy in positioning the pad base relative to the magnetic head, and the shape error caused by the draft occurring when the pad base supporting pins are resin-molded integrally as part of the cassette body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a sectional view showing an inside of the tape cassette 10 of the first embodiment according to the invention, wherein the tape cassette 10 is being engaged in the mechanism;

FIGS. 6a and 6b are a plan view and a side view showing main elements of a mechanism in which the tape cassette 10 of the embodiment of the invention is to be loaded, wherein the tape cassette 10 is not engaged in the mechanism;

FIGS. 8a and 8b are a plan view and a side view showing main elements of the same mechanism as in shown in FIG. 6, in which the tape cassette 10 of the embodiment of the invention is to be engaged, wherein the tape cassette is being engaged in the mechanism with a magnetic head 8 inserted in the tape cassette 10;

FIG. 19(a) and (b) are sectional views showing an inside of the tape cassette 10 of the fifth embodiment according to the invention, wherein the tape cassette 10 is being engaged in the mechanism with a magnetic head 8 inserted in the tape cassette 10.

DESCRIPTION OF THE PREFERRED EMBODIMENTS

Embodiments of the present invention will be hereinafter described in detail with reference to the accompanying drawings.

First of all, description will be made of a first embodiment.

Figure 1:
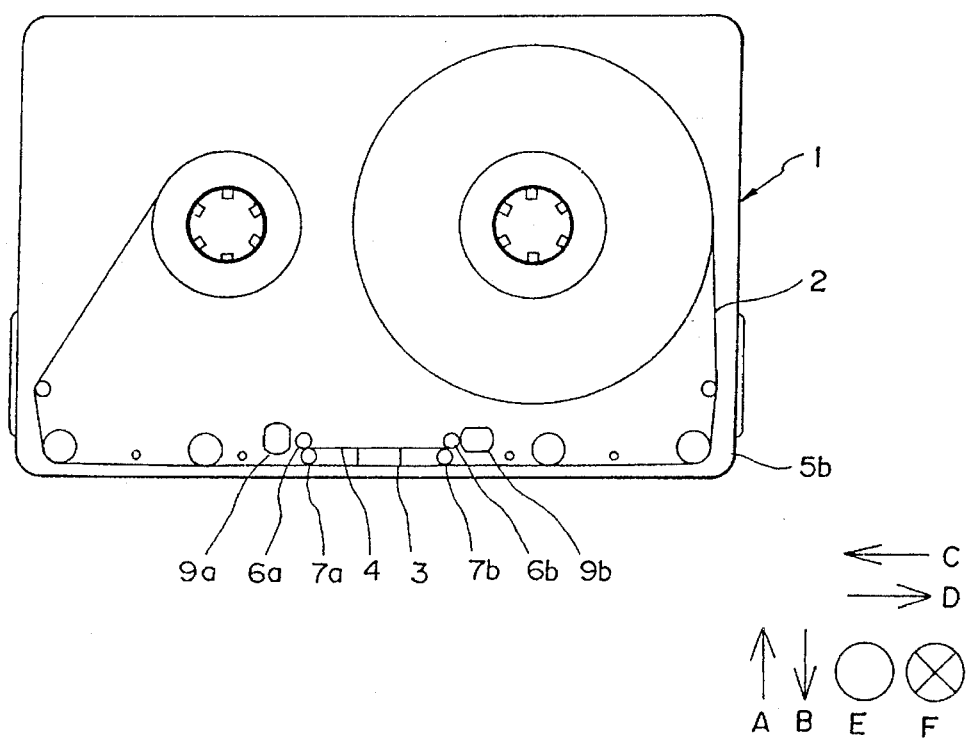
FIG. 1 is a sectional view showing one example of a prior art tape cassette, wherein a tape cassette 1 is not engaged in a mechanism.
Figure 2:
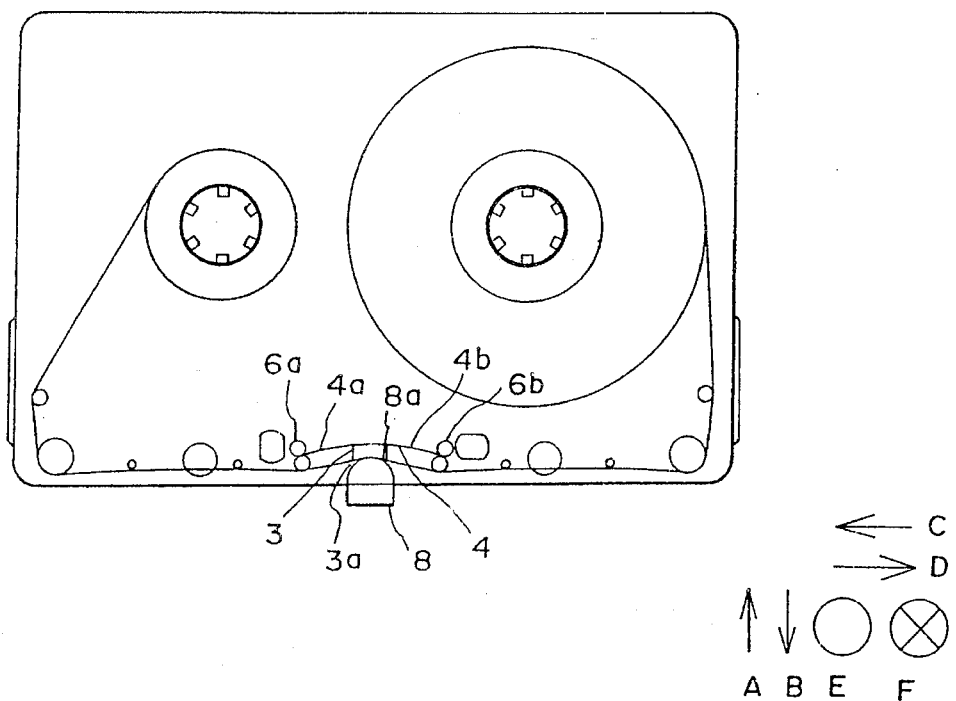
FIG. 2 is a sectional view showing the prior art tape cassette of the same example shown in FIG. 1, wherein the tape cassette 1 is being engaged in the mechanism with a magnetic head 8 inserted in the tape cassette 1.
Figure 3A:
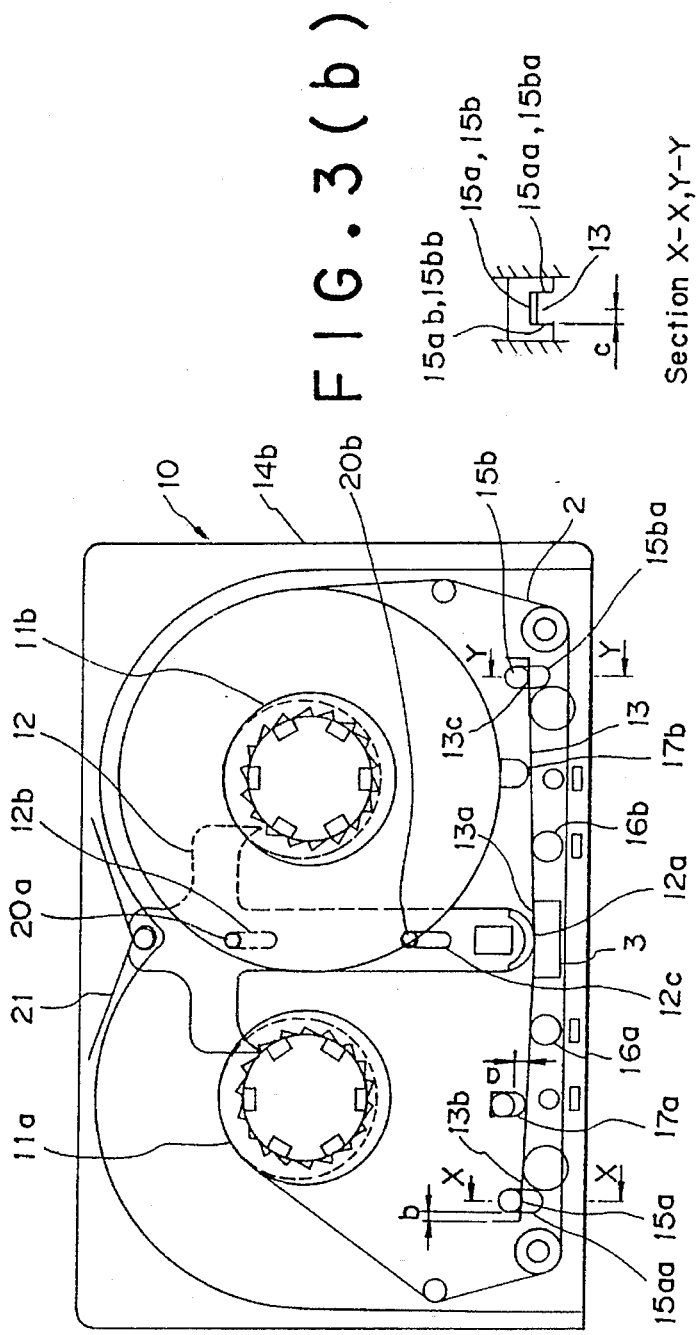
FIG. 3(a) and (b) are sectional views showing an inside of a tape cassette 10 of a first embodiment according to the invention, wherein the tape cassette 10 is not engaged in a mechanism.

FIG. 3 is a sectional view showing an inside of a tape cassette 10 of a first embodiment according to the invention, wherein the tape cassette 10 is not engaged in a mechanism. As shown in FIG. 3(a), magnetic tape 2 is wound on reel hubs 11a and 11b, which are locked unrotatable by a reel locking plate 12. A pressure pad 3 is adhered to and supported by a pad base 13. The pad base 13 in turn is supported by pad base supporting pins 15a and 15b which are resin-molded as part of a cassette half 14b, while being restricted in an inserting/retracting direction of a magnetic head 8 (in a direction shown by arrows A and B), in a tape running direction of the magnetic tape 2 (in a direction shown by arrows C and D) and in a width direction of the tape 2 ( in a direction of arrows E and F). In addition, the center portion 13a of the pad base 13 is restricted in position while being pressed against primary guide pins 16a and 16b (which will be referred to as PGP for short) integrally resin-moulded as part of the cassette half 14b by means of one end portion 12a of the reel locking plate 12. The position of the reel locking plate 12 is regulated by position restricting slots 12b, 12c, and position restricting pins 20a, 20b for reel locking plate, while pressed by a spring 21 in the direction of arrow B.

Figure 3B:
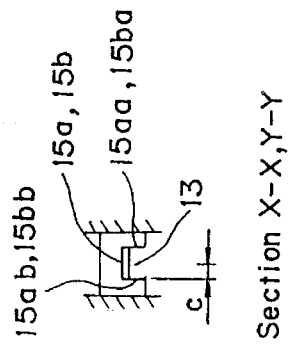

More specifically, the pad base 13 is pressed at the center portion 13 thereof by the end portion 12a, and consequently, the pad base 13 is elastically curved in the direction of arrow A as shown in FIG. 3. Thus, bending pad base 13 is kept balanced with the support ends 13b and 13c pressing against the respective pad base supporting pins 15a and 15b. In this arrangement, there exists a clearance "a" between the pad base 13 and each of the positions in which pad support pins (which will be referred to as PSP's) planted directly on the mechanism are to be placed. Due to the presence of the clearance "a", the PSP's do not interfere with the pad base 13 when the PSP's are inserted in reference holes 17a and 17b. As stated heretofore, the pad base 13 is held unmovable in the direction of arrows A and B. Next, the support ends 13b and 13c of the pad base 13 each are bent in the direction of arrow A with a clearance "b" spaced relative to the pad base supporting pins 15a and 15b, respectively, so that the pad base 13 may not shift in the direction of arrows C and D. In other words, the pad base 13 can and is restricted in position to move within the clearance "b" with respect to the direction of arrows C and D. The support end 13b is, as detailed in FIG. 3(b), restricted keeping a clearance "c" in direction of arrows E and F by edges 15aa, 15ab of the pad base supporting pin 15a. That is, the support end 13b can and is restricted only to move within the clearance "c" with, respect to the direction of arrows E and F. The similar relation holds between the support end 13c and edges 15ba, 15bb of the pad base supporting pin 15b of the pad base supporting pin 15a. That is, the support end 13b can and is restricted only to move within the clearance "c" with respect to the direction of arrows E and F. The similar relation holds between the support end 13c and edges 15ba, 15bb of the pad base supporting pin 15b.

Next referring to FIG. 4, a case where the tape cassette 10 of the first embodiment constructed as stated above is engaged in the mechanism. In the mechanism is shown, a release pin (to be abbreviated as RP hereinafter) 18, PSP's 19a and 19b are provided. Once the tape cassette 10 is engaged in the mechanism, the RP 18 is inserted into an RP fit-in hole 12d of the reel locking plate 12, whereby the reel locking plate 12 is shifted in the direction of arrow A. With this movement, the locked state of the reel hubs 11a and 11b is disengaged and the pressing due to the end portion 12a against the pad base 13 is released. The RP 18 has a bevel at the end 18a thereof as shown in FIG. 4. This end 18a serves to shift the RP fit-in hole 12d in the direction of arrow A, whereas the end 18a receives a pressing force exerted by the reel locking plate 12 in the direction of arrow B. The tape cassette 10 is positioned by an unillustrated cassette holder so as not to be displaced in the direction of arrow A by the pressing force. In conjunction with the shift of the reel locking plate 12 in the direction of arrow A, the pad base 13 is changed in its state from an elastically deformed state or a state of being curved in the direction of arrow B into a free state, in which the pad base 13 is supported freely between the pad base supporting pins 15a, 15b and PGP 16a, 16b. When the tape cassette 10 is being engaged in the mechanism, the PSP's 19a and 19b are also inserted in as well as the PR 18 as stated above. At this time, the PSP's 19a and 19b are inserted into the reference holes 17a and 17b, respectively. Comparing the timings of insertion of the PSP's 19a, 19b and the RP 18 into the cassette half 14b, the PSP's 19a and 19b are at first inserted before the PR 18 is, since the full length of the PSP 19a, 19b is inserted larger than that of RP 18 as shown FIG. 4. Accordingly, when the PSP's 19a and 19b start to be fit in the cassette half 14b, an initial clearance "a" exists between each of the PSP's 19a, 19b and the pad base 13 as shown FIG. 3(a). Then the RP 18 begins being fit in, the clearance starts to reduce. With the tape cassette 10 completely "fitted in the mechanism, the clearance "d" is made present between each of the PSP's 19a, 19b and the pad base 13, as shown in FIG. 4. From the above, with the PSP's 19a, 19b and the RP 18 fitted into the tape cassette 10, the elastic deformation of the pad base 13 is relaxed, and the base pad 13 is freed upon completion of engagement of the tape cassette 10 with the mechanism. In this state, there still exists the clearance "d" between each of the PSP's 19a, 19b and the pad base 13, therefore any interference therebetween does not occur. Here, the tape cassette 10 is positioned relative to the mechanism using the PSP's 19a and 19b as reference pins as used in a conventional manner.

Figure 5:
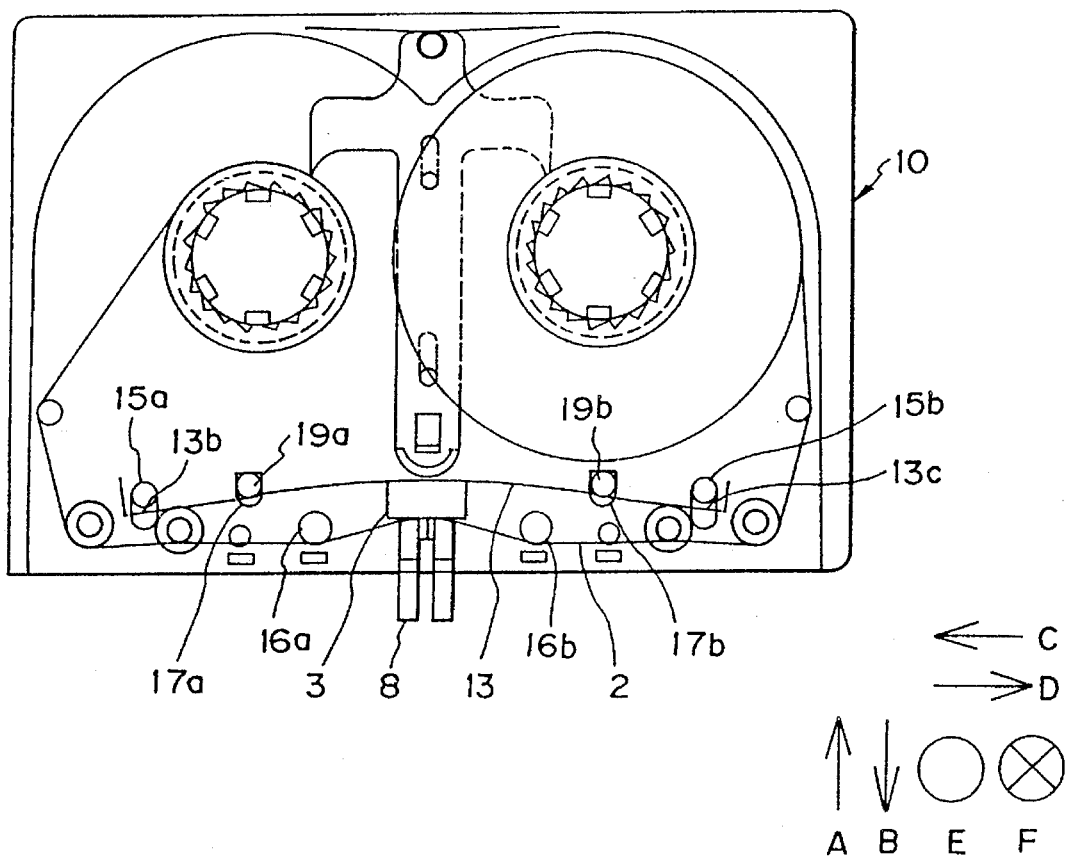
FIG. 5 is a sectional view showing an inside of the tape cassette 10 of the first embodiment according to the invention, wherein the tape cassette 10 is being engaged in the mechanism with a magnetic head 8 inserted in the tape cassette 10.

Referring now to FIG. 5, description will be made of a case in which, with the tape cassette 10 fitted in the mechanism, the magnetic head 8 is inserted into the cassette 10 for the purpose of recording or reproducing operation. When the magnetic head 8 is engaged in the tape cassette 10, the magnetic tape 2 is pressed onto the magnetic head 8 by means of the pressure pad 3 as shown in the figure. The contact angles of the supplied tape relative to the magnetic head 8 are determined dependent on the positions of the PGP's 16a and 16b disposed in both sides of the magnetic head 8. In this arrangement, there may be often provided a pair of tape guides each of which is positioned between the magnetic head 8 and the respective PGP's 16a or 16b (here, in the first embodiment, these members are omitted for simplicity). In this state, the magnetic tape 2 is made to run in the direction of arrow C or D by means of a capstan or any other kind of driver (not shown), to effect magnetic recording or reproducing operation. Subsequently, the pad base 13 is shifted in the direction of arrow A to a predetermined position by the magnetic head 8 through the pressure pad 3 therebetween. At this time, the pad base 13, abutting against the PSP's 19a and 19b, is elastically deformed or curved in the direction of the arrow A. The pressing force to press the magnetic tape 2 onto the magnetic head 8 is produced by a combination of the elastic deformation or coverture of the pad base 13 and the reaction due to the elastic deformation of the pressure pad 3, though the latter makes a slight contribution. In this particular state, the support ends 13b and 13c of the pad base 13 are spaced apart in the direction of the arrow B from the respective pad base supporting pins 15a and 15b, so that the position and posture of the pad base 13 (the alignment of the pad base 13 with respect to the width direction of the magnetic tape 2 relative to the magnetic head 8) is not influenced by the pad base supporting pins 15a and 15b. This is because the posture of the pad base 13 is regulated by the PSP's 19a and 19b. Although the pad supporting pins 15a and 15b regulate the pad base 13 in the directions of arrows C and D, and arrows E and F, the restriction does have little influence upon the pressure distribution across the width of the magnetic tape 2, which has been assumed to be problematic in the prior art. As stated heretofore, the posture of the pad base 13 is dependent upon the PSP's 19a and 19b, which can be composed of a metallic material such as, for example, SUS303. Since such a metallic material can be formed into a cylindrical shape with high precision, it is possible to eliminate a shape error or deviation such as draft caused by the prior art metal die process or a shape error caused by deformation and change with time passage. Thus, the alignment of the pad base 13 to the magnetic head 8 can be controlled with high precision.

Next, the positional relationship between the magnetic head 8 and the pad base 13 will be discussed. With regard to the four elements on the dimensional tolerances which dominate the positional accuracy of the both, the adoption of the PSP's 19a and 19b eliminates the necessity for consideration about the elements: (B) a positioning tolerance at the time when the cassette half 14b (or the tape cassette 10 in a broad sense) is fitted in the mechanism; and (C) a positional tolerance of the distance between the reference holes 17a and 17b on the cassette half 14b and the pad base supporting pins 15a and 15b. In other word, the pad base 13 is positioned relative to the PSP's 19a and 19b planted on the mechanism, and therefore receives no influence from the tape cassette 10 existing therebetween. On the other hand, the magnetic head 8 is positioned relative to the PSP's 19a and 19b on the mechanism, so that, consideration of dimensional tolerances of four elements stated above, may be and is to be, given only two elements, that is, (A) an assembling tolerance at the time when the magnetic head 8 is assembled to the mechanism; and (D) a thickness tolerance of the pressure pad 3. Accordingly, with control of these elements it is possible to control the positional accuracy between the magnetic head 8 and the pad base 13 with high precision.

Figure 7A:
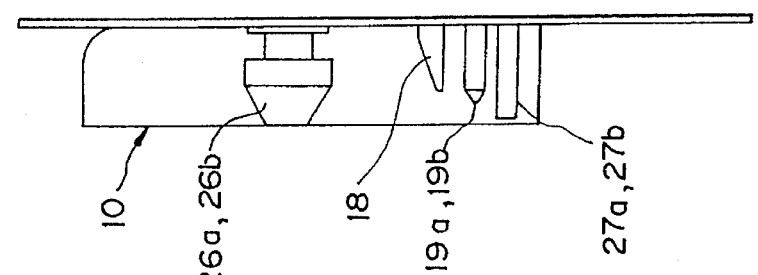
FIGS. 7a and 7b are a plan view and a side view showing main elements of the same mechanism as in shown in FIG. 6, in which the tape cassette 10 of the embodiment of the invention is to be loaded, wherein the tape cassette is being engaged in the mechanism.
Figure 7B:
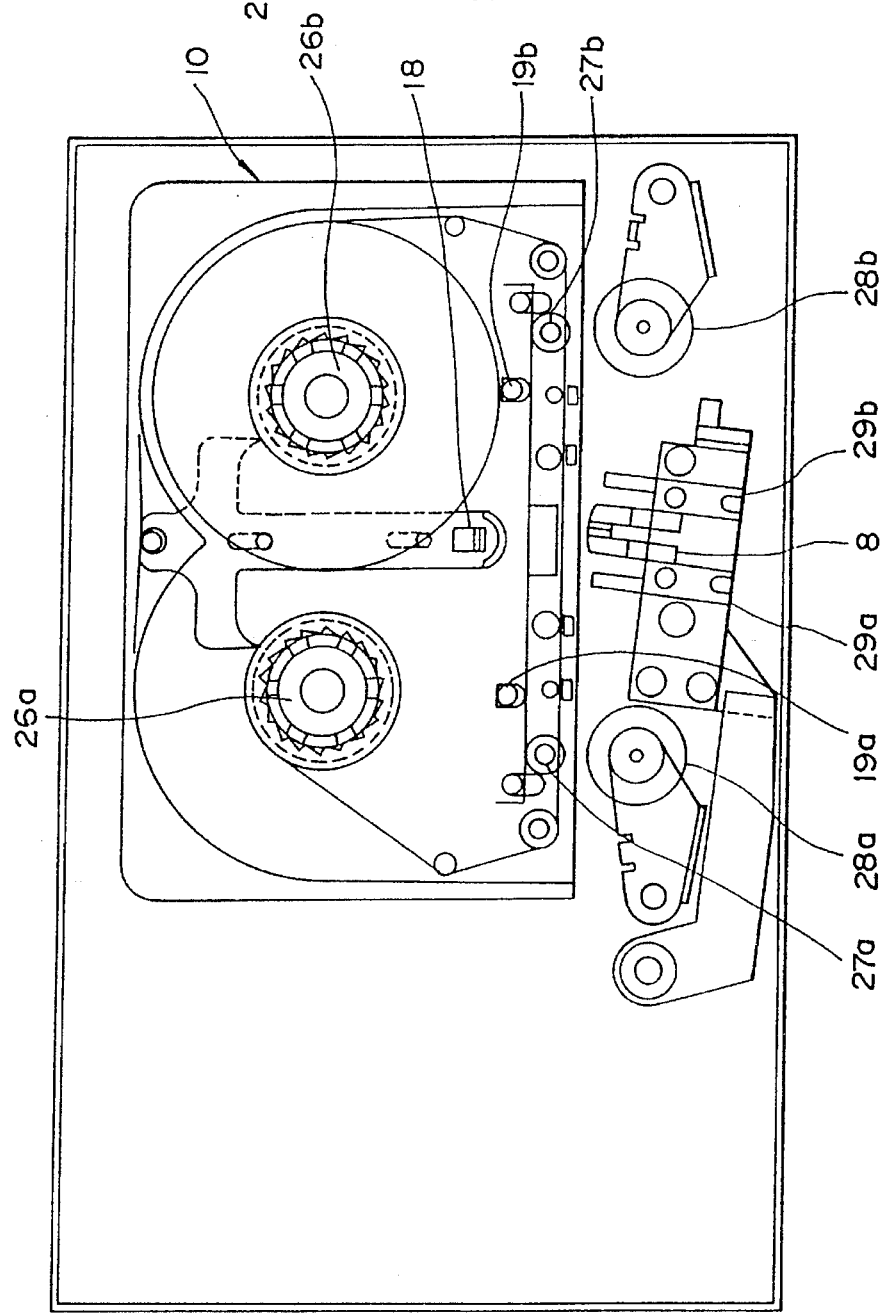

An example of the mechanism of a magnetic recording/reproducing apparatus is shown in FIGS. 6 to 8. FIG. 6 shows a state in which the tape cassette 10 is not loaded; FIG. 7 shows a state in which the tape cassette 10 is loaded; and FIG. 8 shows a state in which the tape cassette 10 is loaded and the magnetic head is inserted into the cassette case. Each of FIGS. 6 to 8 includes a sectional plan view in (a), and a longitudinal section in (b). As stated above, the relative position between the PSP's 19a and 19b, and the magnetic head being inserted as shown in FIG. 8 is controlled.

When the magnetic head 8 is retracted from the tape cassette 10, and when the tape cassette 10 is ejected from the mechanism, all the procedures described above are reversed, and thus interference between the PSP's 19a and 19b, and the pad base 13 may be prevented.

The same mechanism in the magnetic recording/reproducing apparatus will be employed in second to fifth embodiments described hereinafter.

Now, a second embodiment of the present invention will be described.

Figure 9:
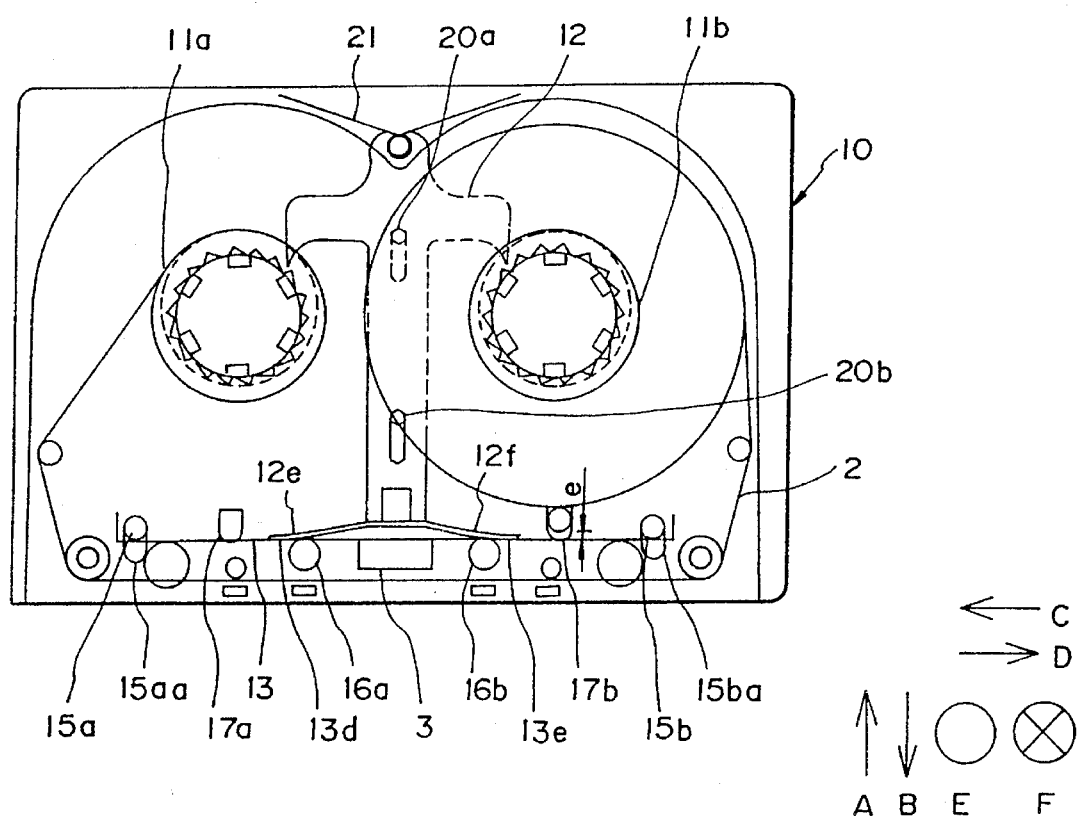
FIG. 9 is a sectional view showing an inside of a tape cassette 10 of a second embodiment according to the invention, wherein the tape cassette 10 is not engaged in a mechanism.

FIG. 9 shows a configuration of a tape cassette 10 according to a second embodiment. That is, FIG. 9 is a sectional view showing an inside of a tape cassette 10 of a second embodiment, like FIG. 3(a) shows the above first embodiment. In FIG. 9, the tape cassette 10 is not loaded in a mechanism. As shown in FIG. 9, a pad base 13 is supported by pad base supporting pins 15a and 15b while being restricted in position in directions of arrows C and D and arrows E and F. In addition, the pad base 13 is restricted in position such that end portions 12e and 12f of a reel locking plate 12 press respective press points 13d and 13e against PGP's 16a and 16b. The press points 13d and 13e are positioned outside the PGP's 16a and 16b, and the pad base 13 is elastically curved in the direction of arrow A as shown in FIG. 9. At this time, a clearance "e" exists between the pad base 13 and a position in which each of PSP's 19a and 19b is to be placed. Due to the presence of the clearance "e", the PSP's 19a and 19b do not interfere with the pad base 13 at times the PSP's 19a and 19b are inserted in reference holes 17a and 17b. As stated heretofore, the pad base 13 is restricted unmovable in the direction of arrows A and B. Next, the restrictions in the aforementioned directions of arrows C and D and arrows E and F, are imposed in the same manner as in the first embodiment. That is, the pad base 13 is restricted movable within a range of a clearance "b" in the direction of arrows C and D, and within a range of a clearance "c" in the direction of arrows E and F.

Figure 10:
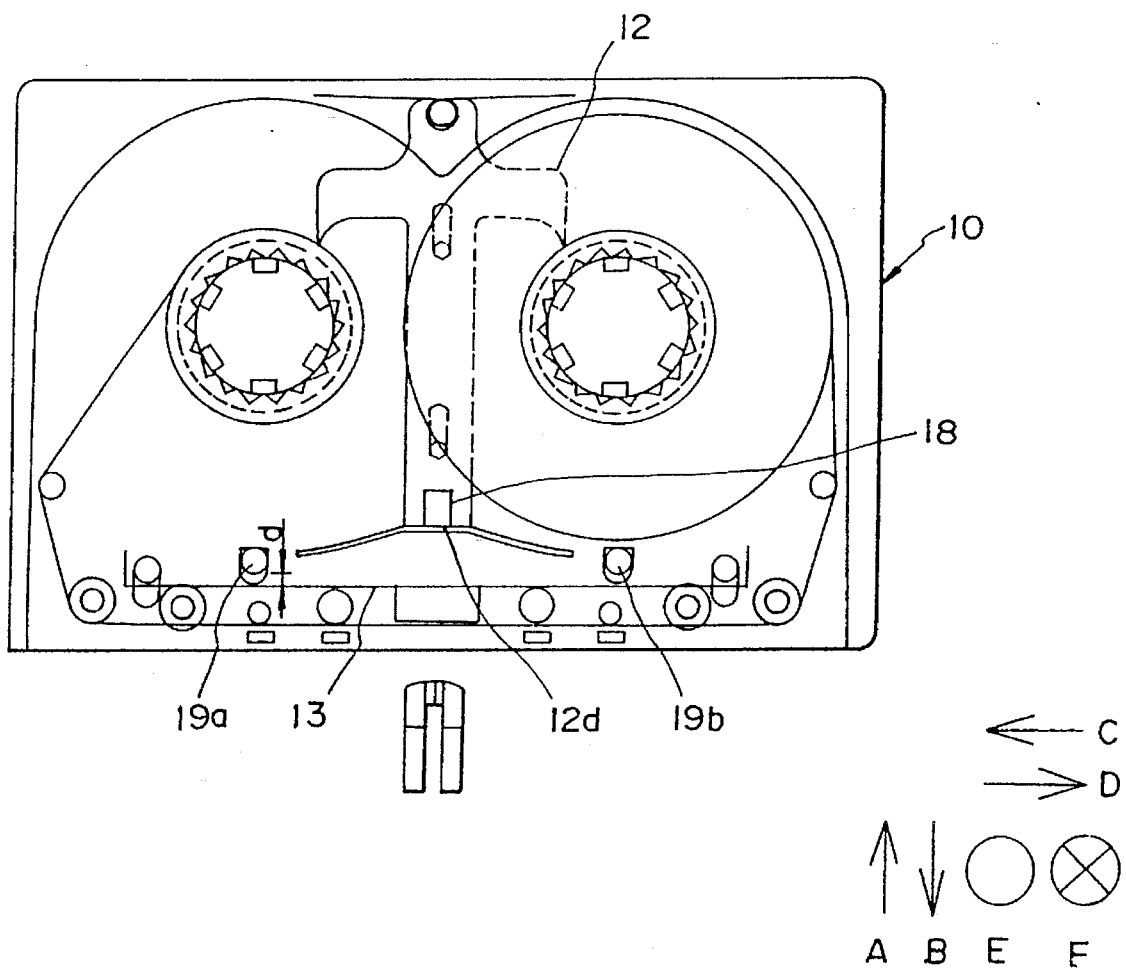
FIG. 10 is a sectional view showing an inside of the tape cassette 10 of the second embodiment according to the invention, wherein the tape cassette 10 is being engaged in the mechanism.
Figure 11:
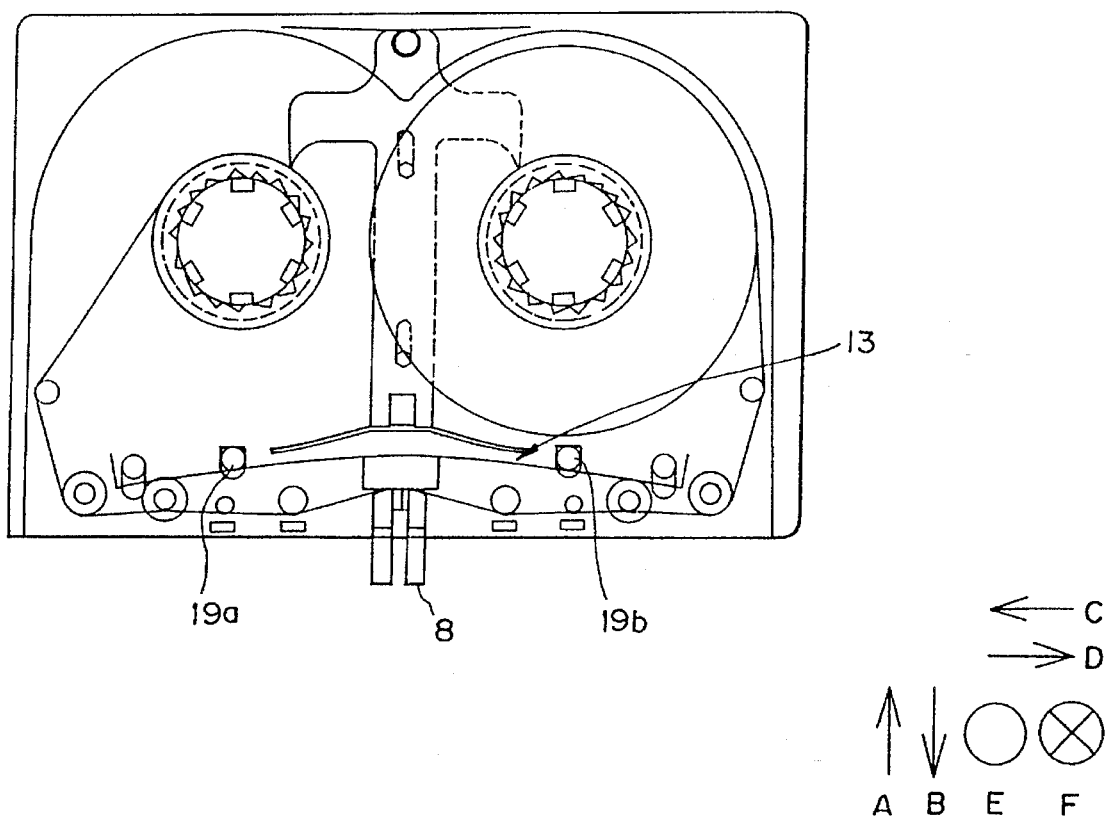
FIG. 11 is a sectional view showing an inside of the tape cassette 10 of the first embodiment according to the invention, wherein the tape cassette 10 is being engaged in the mechanism with a magnetic head 8 inserted in the tape cassette 10.

Next, referring to FIG. 10, a description will be made of a case in which the tape cassette 10 of the second embodiment as constructed as stated above, is engaged with the mechanism. In this case, like the first embodiment, insertion of the RP 18 in the corresponding hole, causes the reel locking plate 12 to move in the direction of arrow A, thus releasing the pad base 13. In this free state, there exists the clearance "d" between each of PSP's 19a and 19b, and the pad base 13. Referring now to FIG. 11, description will be made of a case in which the tape cassette 10 is fitted in the mechanism with the magnetic head 8 inserted. In this case, the posture of the pad base 13 is regulated by the PSP's 19a and 19b as shown in FIG. 11, thus making it possible to control with high precision the alignment of the base pad 13 to the magnetic head 8 and the positioning accuracy, as in the first embodiment.

A third embodiment will be described hereinafter.

Figure 12A:
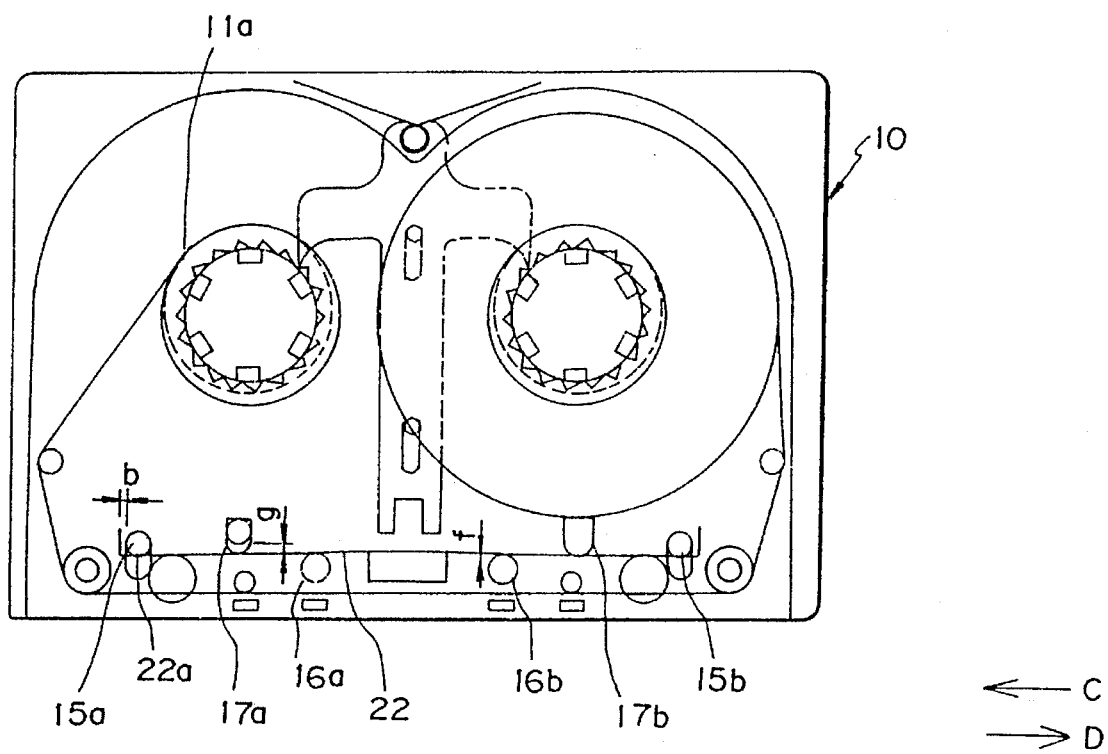
FIG. 12(a) and (b) are sectional views showing an inside of a tape cassette 10 of a third-embodiment according to the invention, wherein the tape cassette 10 is not engaged in a mechanism.
Figure 12B:
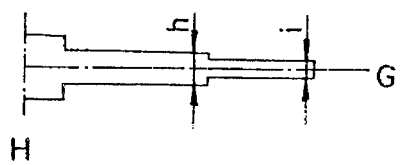

FIG. 12 shows a configuration of a tape cassette 10 according to a third embodiment. FIG. 12(a), like FIG. 3(a) and FIG. 9(a) of the above embodiments (i.e the first and second embodiments), is a sectional view of an inside of the tape cassette 10, wherein the tape cassette 10 is not engaged in a mechanism. A pad base 22 is supported by PGP's 16a and 16b and pad base supporting pins 15a and 15b such that the pad base 22 is restricted in the direction of arrows A and B. In addition, the pad base supporting pins 15a and 15b support the pad base 22 while restricting movement in the direction of arrows C and D, and in direction of arrows E and F. In this embodiment the PGP's 16a and 16b are offset by a distance "f" in the direction of arrow A. That is, the pad base 22 is incorporated in the tape casette 10, being elastically curved in the direction of arrow A as shown in FIG. 12, with pre-load pressing the pad base supporting pins 15a and 15b in the direction of arrow A and pressing the PGP's 16a and 16b in the direction of arrow B. At this time, there exists a clearance "g" between the pad base 22 and a position in which each of the PSP's 19a and 19b is to be. With this clearance, the interference between the PSP's 19a and 19b and the pad base 22 can be prevented when the PSP's 19a and 19b are inserted into respective reference holes 17a and 17b. The positional restrictions with respect to the direction of arrows C and D and the direction of arrows E and F, are imposed as in the aforementioned two embodiments. That is, the pad base 22 is movable within a clearance "b" in the direction of arrows C and D and within a clearance "c" in the direction of arrows E and F. Here, FIG. 12 (b) shows the pad base 22 of FIG. 12 (a) viewed in a direction of arrow A. As is shown in FIG. 12(b), the pad base 22 has support ends 22a and 22b having a width "i" in the direction of arrows E and F. The width "i" is sufficiently smaller than a width "h" of the inner portion to the end. Here, at least the portions of the pad base 22 abutted against the PSP's 19a and 19b are adapted to have the width "h". As is apparent from FIG. 12(b), the pad base 22 is symmetric with respect to the center line G–H.

Figure 13:
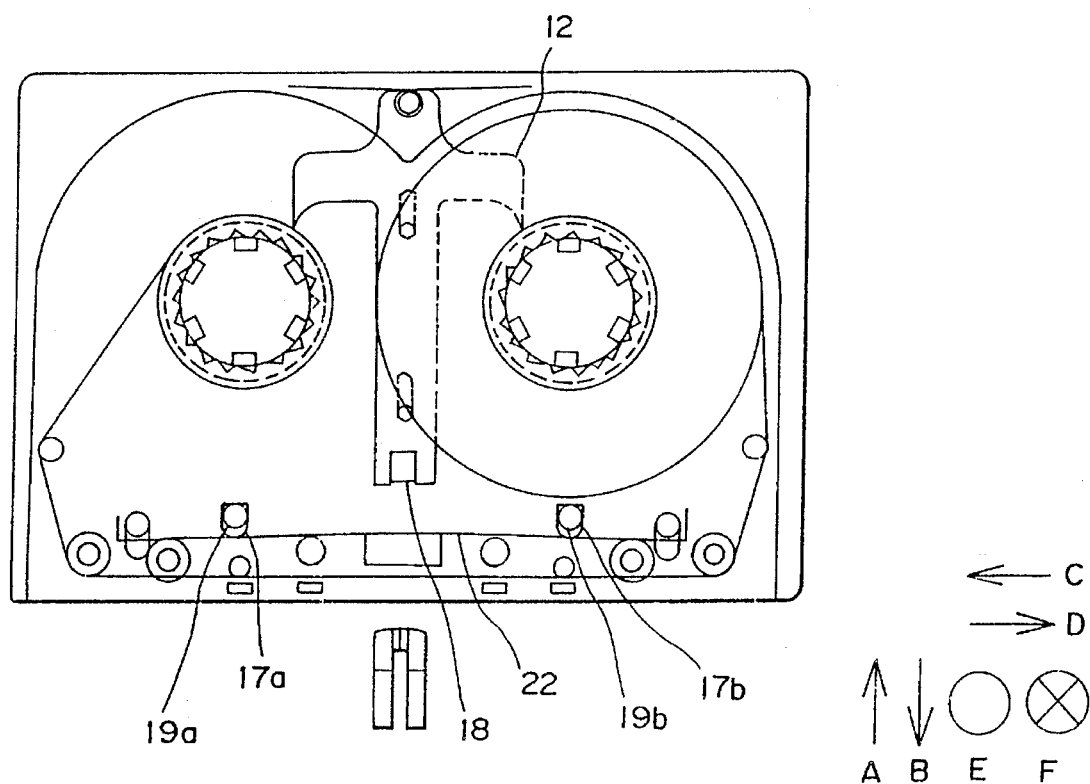
FIG. 13 is a sectional view showing an inside of the tape cassette 10 of the third embodiment according to the invention, wherein the tape cassette 10 is being engaged in the mechanism.

Referring to FIG. 13, an explanation will be made of a case in which the tape cassette 10 of the third embodiment thus constructed, is engaged with the mechanism. In this case, differing from the embodiments already described, with an RP 18 inserted, a reel locking plate 12 is shifted in the direction of arrow A, but the reel locking plate 12 is not connected with the pad base 22, so that if the PSP's 19a and 19b are inserted into reference holes 17a and 17b, a state in which the pad base 22 is supported is unchanged.

Figure 14:
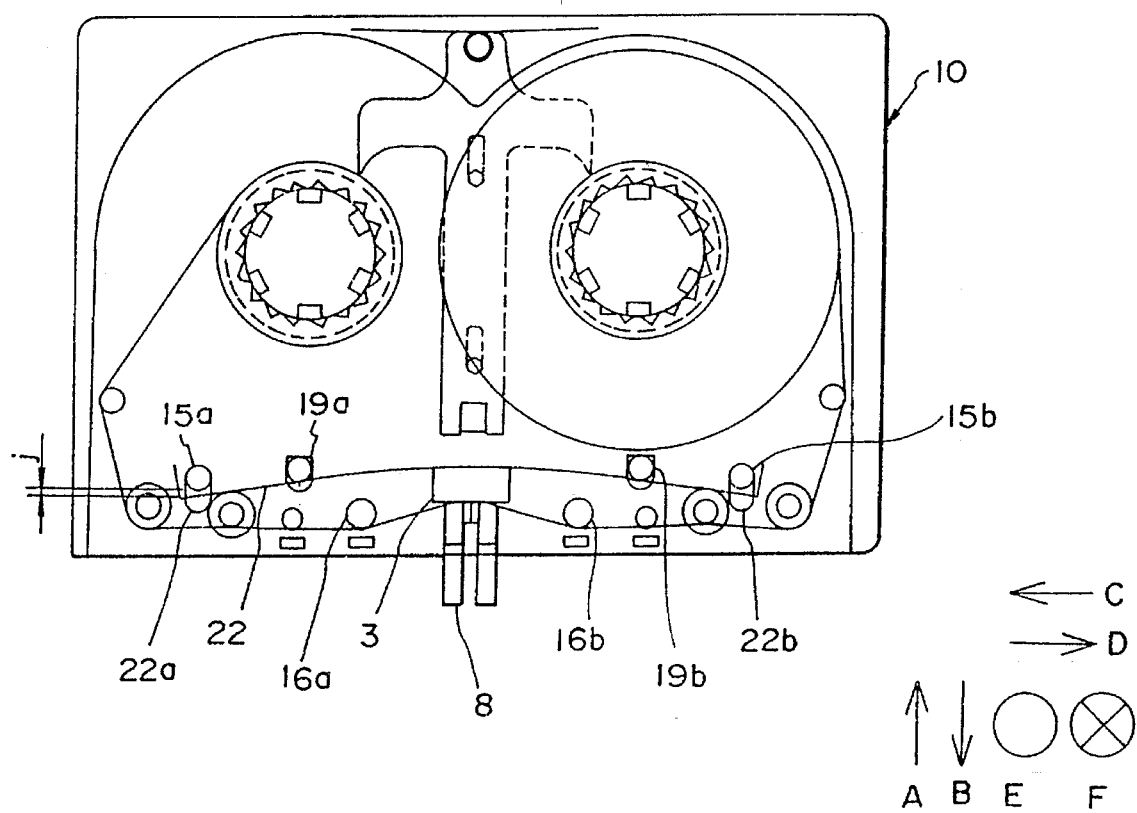
FIG. 14 is a sectional view showing an inside of the tape cassette 10 of the third embodiment according to the invention, wherein the tape cassette 10 is being engaged in the mechanism with a magnetic head 8 inserted in the tape cassette 10.

Next, referring to FIG. 14, a description will be made of a case in which the tape cassette 10 is engaged in the mechanism with the magnetic head 8 inserted. When the magnetic head 8 is fitted in the tape cassette 10, the pad base 22 is shifted in the direction of arrow A to a predetermined position through a pressure pad 3 by the magnetic head 8. Now, this procedure will be explained in order. The pad base 22 is moved with support ends 22a and 22b being kept abutted against pad base supporting pins 15a and 15b, respectively. At the time when the portions which are to be abutted against the PSP's 19a and 19b, is shifted by the clearance "g", the pad base 22 starts to be restricted by the PSP's 19a and 19b, to be moved to the predetermined position. Upon completion of the movement, the pad base 22 is elastically deformed or curved in the direction of arrow A to be balanced, while pressing the magnetic head 8 in the direction of arrow B and the PSP's 19a and 19b in the direction of arrow A. Here, the support ends 22a and 22b are restricted in their positions by the pad base supporting pin 15a and 15b, until the pad base 22 is abutted against the PSP's 19a and 19b. But, after the pad base 22 abuts against the PSP 19a and 19b, the pressure of the support ends against the pad base supporting pins 15a and 15b is being reduced. Then, when the pad base 22 reaches the predetermined position, the support ends 22a and 22b become free with a clearance "j" spaced from the pad base supporting pins 15a and 15b. Accordingly, the pad base 22 is not affected by the tape cassette 10 with respect to the direction of arrows A and B in the final stage, but is restricted only by the PSP's 19a and 19b. Therefore, it is possible to control the alignment and positional accuracy of the pad base 22 relative to the magnetic head 8, with high precision. In addition, in some cases for instance, the clearance "j" might not appear due to accumulation of the aforementioned dimensional errors dominating the positioning accuracy between the magnetic head 8 and the pad base 22, particularly the accumulation of dimensional errors of (A) and (D). In such a case, the support ends 22a and 22b remain abutted against the pad base supporting pins 15a and 15b, even when the pad base 22 reaches the predetermined position. Therefore, the support ends 22a and 22b ought to be pressed with the reaction of the pins 15a and 15b. Even in such a circumstances, the width "i" in the direction of arrows E and F of the support ends 22a and 22b is set small compared to the width "h" in the inner side, so that little influence will be exerted upon the pressing force of the pad base 22 toward the magnetic head 8 and upon the posture of the pressure pad 3.

A fourth embodiment will now be described.

Figure 15:
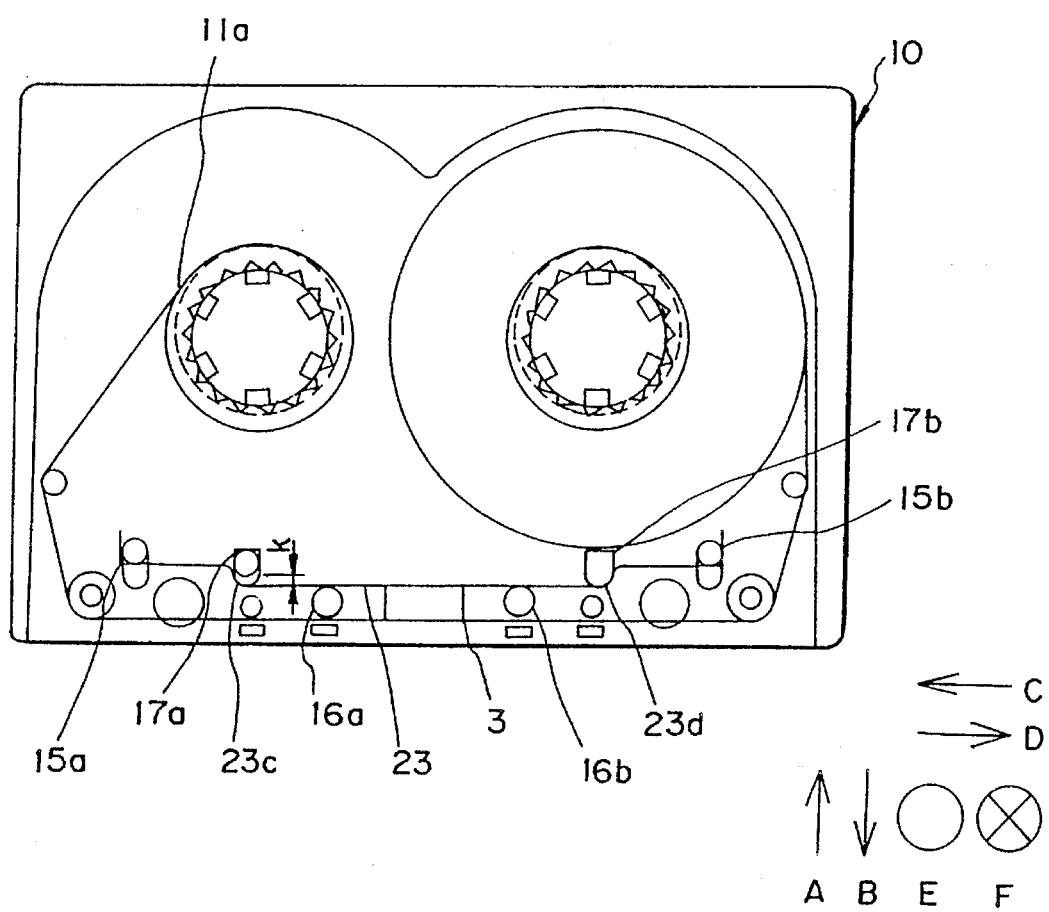
FIG. 15 is a sectional view showing an inside of a tape cassette 10 of a fourth embodiment according to the invention, wherein the tape cassette 10 is not engaged in a mechanism.

FIG. 15 shows a configuration of a tape cassette 10 according to a fourth embodiment. Specifically, FIG. 15(*a*), like FIG. 3(*a*), FIG. 9(*a*) and FIG. 12(*a*) of the above embodiments (i.e the first, second and third embodiments), is a sectional view of an inside of the tape cassette 10, wherein the tape cassette 10 is not engaged in a mechanism. In the fourth embodiment, no reel locking plate 12 is illustrated, which are described in the above first, second and third embodiments. The member is omitted here, since the existence of the reel locking plate 12 does not relate directly to the description of the embodiment. It should be noted that a tape cassette 10 with a reel locking plate 12 provided would no longer disturb the functions of the embodiment that will be detailed. A pad base 23 is supported by PGP's 16a and 16b, and pad base supporting pins 15a and 15b such that the pad base 23 is restricted in the direction of arrows A and B. In addition, the pad base supporting pins 15a and 15b support the pad base 23 while restricting movement in direction of arrows C and D, and in direction of arrows E and F. Like the third embodiment, the pad base 23 is incorporated in the tape casette 10, being elastically curved in the direction of arrow A with pre-load. At this time, there exists a clearance "k" between the pad base 23 and a position in which each of the PSP's 19a and 19b is to be. With this clearance, the interference between the PSP's 19a and 19b and the pad base 23 can be prevented when the PSP's 19a and 19b are inserted into reference holes 17a and 17b. The positional restrictions with respect to the direction of arrows C and D and the direction of arrows E and F, are imposed as in the third embodiment. Here, PSP-abutting portions 23c and 23d of the pad base 23 abutted against the PSP's 19a and 19b are bent at about 90° (strictly speaking, an angle more than 90°) at two points for each side, totally at four points.

Figure 16:
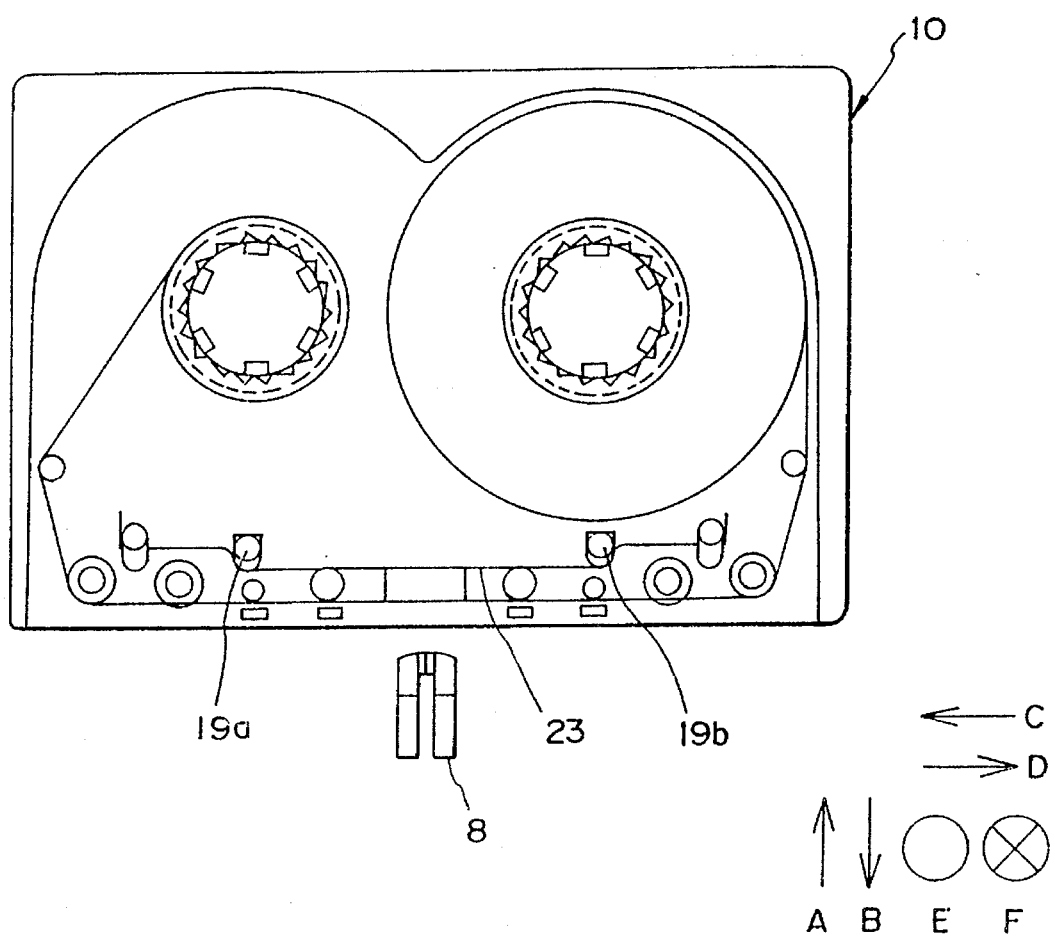
FIG. 16 is a sectional view showing an inside of the tape cassette 10 of the fourth embodiment according to the invention, wherein the tape cassette 10 is being engaged in the mechanism.
Figure 17:
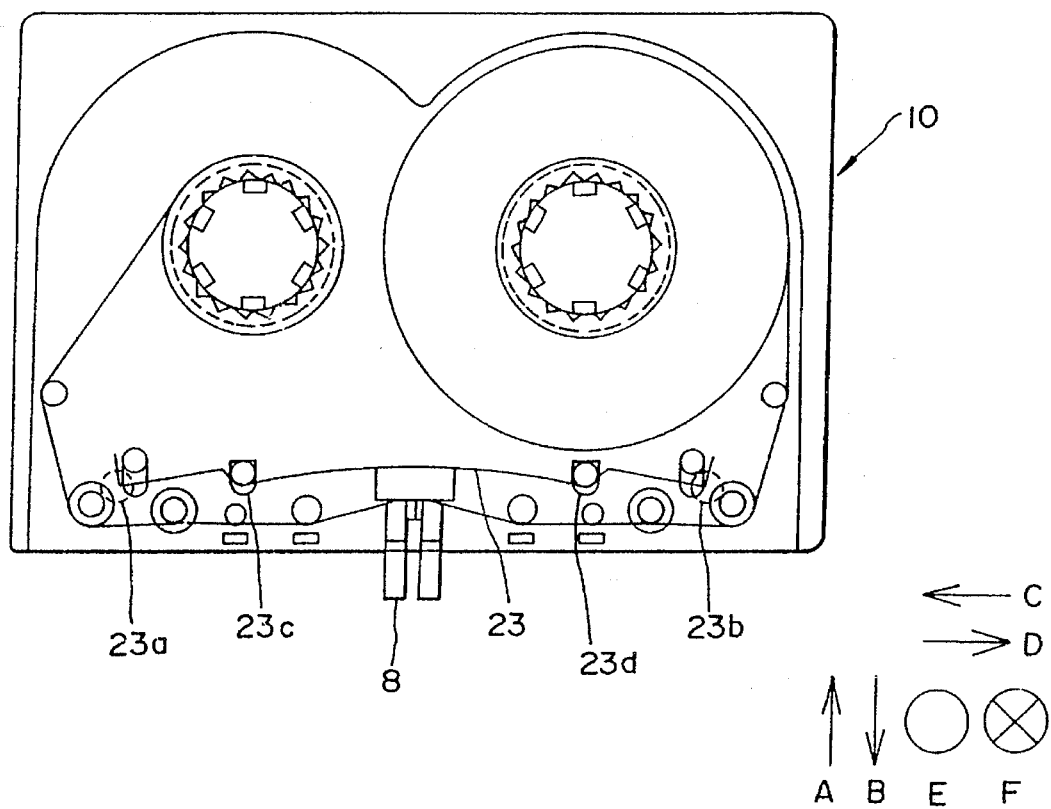
FIG. 17 is a sectional view showing an inside of the tape cassette 10 of the fourth embodiment according to the invention, wherein the tape cassette 10 is being engaged in the mechanism with a magnetic head 8 inserted in the tape cassette 10.

Next, referring to FIG. 16, a description will be made of a case in which the tape cassette 10 of the fourth embodiment is engaged in the mechanism. In this case, the pad base 23 is, as shown in FIG. 16, supported in the same manner described in the third embodiment, and therefore the supporting state is unchanged. Referring now to FIG. 17, description will be made of a case in which the tape cassette 10 is fitted in the mechanism with the magnetic head 8 inserted. As is shown in FIG. 17, effected is the same procedure from the insertion of the magnetic head 8 into the tape cassette 10, to shift the pad base 23 in the direction of arrow A to a predetermined position. When the PSP-abutting portions 23c and 23d abut against the PSP's 19a and 19b, respectively, the abutting portions 23c and 23d engage with the PSP's 19a and 19b. At the time when the pad base 23 reaches the predetermined position, the displacement in the right and left direction (or shift in the direction of arrows C and D) and the azimuth displacement (disalignment in the direction of arrows E and F) will be regulated or corrected by the bent portions of the abutting portions of 23c and 23d. The fourth embodiment is characterized in this feature. Meanwhile, the state of support ends 23a and 23b is the same with the third embodiment. As detailed heretofore as regards the fourth embodiment, the position and posture of the pad base 23 is regulated by the PSP's 19a and 19b alone except the position in the direction of arrows E and F, so that it is possible in this embodiment to control a positioning accuracy of the pad with higher precision compared to the first to third embodiments already described.

A description of a fifth embodiment of the present invention follows.

Figure 18B:
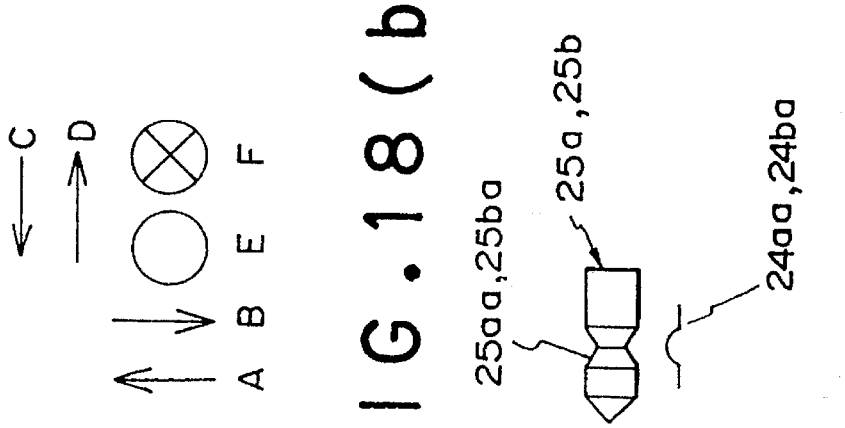
FIG. 18(a) and (b) are sectional views showing an inside of a tape cassette 10 of a fifth embodiment according to the invention, wherein the tape cassette 10 is not engaged in a mechanism.
Figure 18A:
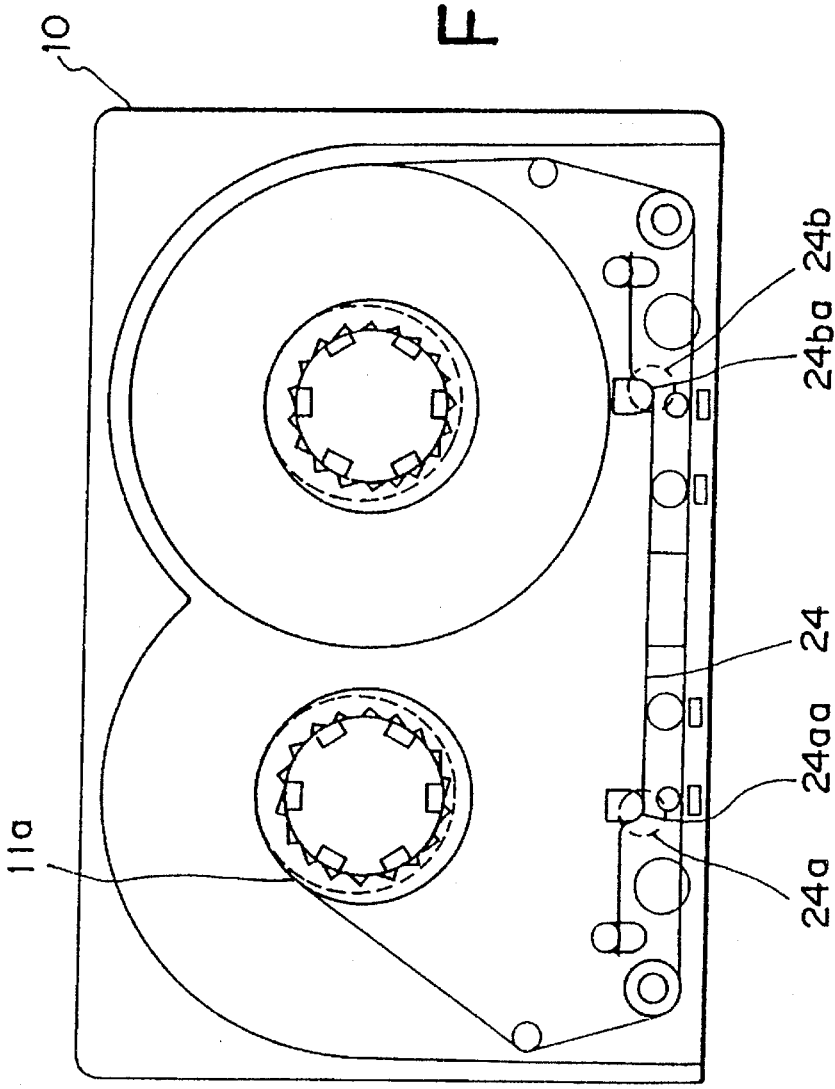

FIG. 18 shows a configuration of a tape cassette 10 according to a fourth embodiment. Specifically, FIG. 18(*a*), like FIG. 3(*a*), FIG. 9(*a*), FIG. 12(*a*) and FIG. 15(*a*) of the above embodiments (i.e the first through fourth embodiments), is a sectional view of an inside of the tape cassette 10, wherein the tape cassette 10 is not engaged in a mechanism. FIG. 18(*b*) is a detailed side view of PSP's 25a and 25b. The basic structure of the fifth embodiment is similar to that of the fourth embodiment, except that, as shown in FIG. 18(*b*), the PSP's 25a and 25b are provided with V-shaped annular grooves 25aa and 25ba for positioning a pad base 24, and that abutting portions 24a and 24b of the pad base 24 against the PSP's 25a and 25b are provided with semi-spherical projections 24aa and 24ba mating with the V-shaped annular grooves 25aa and 25ba, respectively. FIG. 19 shows a case in which the tape cassette 10 of the fifth embodiment is engaged in the mechanism with the magnetic head 8 inserted. Here, description of the tape cassette 10 will be made only about different points from that in the fourth embodiment, with reference to FIG. 19.

At the time when the pad base 24 is shifted to a predetermined position, the semi-spherical projections 24aa and 24ba engage with the V-shaped grooves 25a and 25ba, respectively (refer to FIG. 19(*b*)). In this state, the position and posture of the pad base 24 is regulated by the PSP's 25a and 25b alone with respect to all the directions, i.e., the directions shown by arrows A and B, C and D, and E and F. The inclination against the magnetic head 8 around a rotational axis along the direction shown by arrows C and D can be regulated or corrected stably by the effect of automatic alignment provided by the combination of the V-shaped grooves 25aa, 25ba and the semi-spherical projections 24aa and 24ba.

In accordance with the present invention, it is possible to position the pad base relative to the magnetic head with high precision, without the necessity for strictly controlling the shape error due to the draft which would be caused when the pad base supporting pins are resin-molded integrally. Neither is required to control closely the dimensional tolerances described in (B) and (C) among the four elements of dimensional tolerances stated above. Since the positional relation between the pad base and the magnetic head does not depend upon the shape accuracy of a tape cassette but is dependent on the precision of individual mechanisms. Therefore, any tape cassette of the present invention does not affect the alignment of the pad base with the magnetic head, so that a stable positioning can be achieved at all times. Further, the shape accuracy of tape cassettes has been markedly required in accordance with the demand for high recording density and the tendency to Hi-Fi being developed. It is possible, however, according to the present invention, to relatively relax the regulations on the shape accuracy of basic parts of tape cassette, resulting in a reduction of the manufacture cost. Thus, the present invention makes it possible to provide a novel tape cassette capable of achieving stable and excellent magnetic recording and reproducing operations and which realizes highly accurate head touch necessary for tendency to Hi-Fi and digitization with a simple structure that does not require relatively high shape accuracy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tape cassette for use in a magnetic recording/reproducing apparatus, which includes position means the tape cassette comprising:

a magnetic tape;

a pressure pad;

a pair of insertion holes on at least one side of the tape cassette, positioning means of said magnetic recording/reproducing apparatus being insertable through the pair of insertion holes; and a pad base, positioned by the positioning means and the pressure pad being supportingly affixed on the pad base, wherein said pad base is disposed along said pair of insertion holes, the positioning means which are protrudable through said insertion holes being engageable with said pad base upon said pad base being elastically deformed by a magnetic head of said magnetic recording/reproducing apparatus inserted into said tape cassette.

2. The tape cassette according to claim 1, further comprising a pair of pad base supporting pins, the pad base extending between the pair of pad base supporting pins, a reverse side of both ends of said pad base being loosely engaged by the pad base supporting pins, said pair of pad base supporting pins being resin-molded as a part of at least a half of the cassette, the pad base supporting pins being closer to outer edges of said tape cassette than the pair of insertion holes for said positioning means, a front side of said pad base being loosely supported about a central area by a pair of primary guide pins, said pair of primary guide pins being resin-molded as a part of the cassette, the primary guide pins being closer to a center of the pad base than the pair of insertion holes for the positioning means.

3. The tape cassette according to claim 2, wherein the pair of said pad base supporting pins, said insertion holes for said positioning means and said primary guide pins are disposed generally symmetrically to the center of said pad base and are aligned along a generally parallel axis.

4. The tape cassette according to claim 3, wherein said insertion holes for said positioning means are elongated with a clearance between the reverse side of said pad base and a position in which said positioning means is located in said inserting holes.

5. The tape cassette according to claim 1, further comprising a reel locking mechanism a pair of reel hubs on which said magnetic tape is wound, the reel locking mechanism preventing rotation of the reel hubs and exerting a pre-load to elastically deform said pad base, while said tape cassette is out of said magnetic recording/reproducing apparatus.

6. The tape cassette according to claim 1, wherein the pad base is movable between an engaged position and a disengaged position by insertion of the magnetic head into the tape cassette, the tape cassette further comprising means for holding the pad base in the disengaged, the means for holding being engageable with and disengageable from the pad base, the pad base being elastically deformed when moving from the disengaged position to the engaged position when the magnetic head of the magnetic recording/reproducing apparatus engages the magnetic tape and displaces the pressure pad upon insertion of the magnetic head into said tape cassette, the means for holding the pad base in the disengaged position being disengaged from the pad base prior to the magnetic head moving the pad base from the disengaged position to the engaged position.

7. A tape cassette for use in a magnetic recording/reproducing apparatus, which includes position means the tape cassette comprising:

a magnetic tape;

a pressure pad;

a pair of insertion holes on at least one side of the tape cassette, positioning means of said magnetic recording/reproducing apparatus being insertable through the pair of insertion holes when said tape cassette is inserted into said magnetic recording/reproducing apparatus; and a pad base having said pressure pad fixed thereon, the pad base being positioned by the positioning means;

wherein said pad base is disposed along said pair of insertion holes, the positioning means being engageable with said pad base when said pad base is moved by a magnetic head of said magnetic recording/reproducing apparatus upon insertion of the magnetic head into said tape cassette.

8. The tape cassette according to claim 7, further comprising a pair of pad base supporting pins, the pad base extending between the pair of pad base supporting pins a reverse side of both end of said pad base being loosely engaged by the pad base supporting pins, said pair of pad base supporting pins being resin-molded as a part of the cassette, the pad base supporting pins being closer to outer edges of said tape cassette than the pair of insertion holes for said positioning means, a front side of said pad base being loosely supported about a central area by a pair of primary guide pins, said pair of primary guide pins being resin-molded as a part of the cassette, the primary guide pins being closer to a center of the pad base than the pair of insertion holes for the positioning means.

9. The tape cassette according to claim 8, wherein the pair of said pad base supporting pins, said insertion holes for said positioning means and said primary guide pins are disposed generally symmetrically to the center of said pad base and are aligned along a generally parallel axis.

10. The tape cassette according to claim 9, wherein said insertion holes for said positioning means are elongated with a clearance between the reverse side of said pad base and a position in which said positioning means is located in said inserting holes.

11. The tape cassette according to claim 7, further comprising a reel locking mechanism a pair of reel hubs on which said magnetic tape is wound, the reel locking mechanism preventing rotation of the reel hubs and exerting a pre-load to elastically deform said pad base, while said tape cassette is out of said magnetic recording/reproducing apparatus.

12. The tape cassette according to claim 7, wherein the pad base is movable between an engaged position and a disengaged position by insertion of the magnetic head into the tape cassette, the tape cassette further comprising means for holding the pad base in the disengaged, the means for holding being engageable with and disengageable from the pad base, the pad base being elastically deformed when moving from the disengaged position to the engaged position when the magnetic head of the magnetic recording/reproducing apparatus engages the magnetic tape and displaces the pressure pad upon insertion of the magnetic head into said tape cassette, the means for holding the pad base in the disengaged position being disengaged from the pad base prior to the magnetic head moving the pad base from the disengaged position to the engaged position.

13. A magnetic recording/reproducing system comprising:
   a tape cassette having a magnetic tape, a pair of rotatable reel hubs on which said magnetic tape is wound, a pressure pad and a pad base having said pressure pad fixed thereon,
   the magnetic recording/reproducing apparatus comprising;
   a magnetic head insertable into said tape cassette and engageable with the magnetic tape; and
   positioning means inserted into the tape cassette through insertion holes for positioning said pad base having said pressure pad fixed thereon while said magnetic head is inserted into said tape cassette and said tape cassette is inserted into said magnetic recording/reproducing apparatus.

14. The magnetic recording/reproducing system according to claim 13, wherein a pair of positioning means for positioning of said pad base are placed directly on said magnetic recording/reproducing apparatus so that said positioning means are protrudable through a pair of insertion holes into said tape cassette.

15. The magnetic recording/reproducing system according to claim 14, wherein the positioning means comprises a high precision, cylindrical metallic material.

16. The magnetic recording/reproducing system according to claim 14, wherein said positioning means is provided with an engaging means for engaging between said positioning means and said pad base when said tape cassette is inserted in said magnetic recording/reproducing apparatus.

17. The magnetic recording/reproducing system according to claim 16, wherein said engaging means for engaging between said positioning means and said pad base comprises grooves provided on said positioning means which receive projections provided on said pad base.

18. The magnetic recording/reproducing system according to claim 13, wherein the tape cassette further comprises means for holding the pad base in a disengaged position, the pad base being movable between a disengaged position and an engaged position by the magnetic head when the magnetic head engages the magnetic tape, the means for holding being engageable with and disengageable from the pad base, the means for holding the pad base being disengaged from the pad base prior to the magnetic head moving the pad base from the disengaged position to the engaged position.

* * * * *